(12) United States Patent
Taylor et al.

(10) Patent No.: US 10,678,576 B1
(45) Date of Patent: Jun. 9, 2020

(54) MANAGING DATA STORAGE MIGRATION FOR VIRTUAL MACHINES

(71) Applicant: EMC IP Holding Company LLC, Hopkinton, MA (US)

(72) Inventors: Alan L. Taylor, Cary, NC (US); Anil K. Koluguri, Morrisville, NC (US); William C. Whitney, Marlborough, MA (US); Arun Joseph, Morrisville, NC (US); William S. Burney, Apex, NC (US); Somchai Pitchayanonnetr, Quincy, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 123 days.

(21) Appl. No.: 14/754,961

(22) Filed: Jun. 30, 2015

(51) Int. Cl.
*G06F 9/455* (2018.01)
*G06F 16/11* (2019.01)
*G06F 16/188* (2019.01)

(52) U.S. Cl.
CPC ........ *G06F 9/45558* (2013.01); *G06F 16/119* (2019.01); *G06F 16/188* (2019.01); *G06F 2009/4557* (2013.01); *G06F 2009/45579* (2013.01)

(58) Field of Classification Search
CPC .. G06F 7/78; G06F 8/00–78; G06F 9/44–455; G06F 11/36
See application file for complete search history.

(56) References Cited

U.S. PATENT DOCUMENTS

| | | |
|---|---|---|
| 8,775,861 B1 | 7/2014 | Raizen et al. |
| 8,977,896 B1 | 3/2015 | Thigpen et al. |
| 9,020,994 B1 | 4/2015 | Hilliar et al. |
| 9,122,689 B1 | 9/2015 | Bono et al. |
| 9,229,656 B1 | 1/2016 | Contreras et al. |
| 9,400,611 B1 | 7/2016 | Raizen |
| 9,460,028 B1 | 10/2016 | Raizen et al. |
| 2005/0055512 A1* | 3/2005 | Kishi ............... G06F 12/0804 711/135 |
| 2008/0052331 A1* | 2/2008 | Ogawa ............. G06F 3/0605 |
| 2009/0037680 A1* | 2/2009 | Colbert ............ G06F 3/0617 711/162 |
| 2011/0153697 A1* | 6/2011 | Nickolov ........ G06F 9/4856 707/827 |

(Continued)

OTHER PUBLICATIONS

Hu et al., A Quantitative Study of Virtual Machine Live Migration, in Proceedings of the 2013 ACM Cloud and Autonomic Computing Conference, Miami, FL, Aug. 5-8 (Year: 2013).*

(Continued)

*Primary Examiner* — Brian W Wathen
*Assistant Examiner* — Timothy P Duncan
(74) *Attorney, Agent, or Firm* — BainwoodHuang

(57) ABSTRACT

A technique for managing data storage for virtual machines in a data storage system includes receiving, from a virtual machine administrative program, a request to operate a virtual machine disk (VMD) at a different service level from one at which the data storage system is currently operating the VMD. In response to receiving the request, the data storage system migrates the VMD from a first set of storage extents providing a first service level to a second set of storage extents providing a second service level.

19 Claims, 10 Drawing Sheets

(56) References Cited

U.S. PATENT DOCUMENTS

| | | | | |
|---|---|---|---|---|
| 2012/0137098 A1* | 5/2012 | Wang | ............... | G06F 3/0617 |
| | | | | 711/165 |
| 2013/0073825 A1* | 3/2013 | Terayama | ............ | G06F 3/0607 |
| | | | | 711/165 |
| 2013/0125097 A1* | 5/2013 | Ebcioglu | ............ | G06F 17/5045 |
| | | | | 717/136 |
| 2013/0232480 A1* | 9/2013 | Winterfeldt | ............... | G06F 8/60 |
| | | | | 717/177 |
| 2013/0297869 A1* | 11/2013 | Mills | ............... | G06F 3/0674 |
| | | | | 711/112 |
| 2014/0297979 A1* | 10/2014 | Baron | ............... | G06F 3/0647 |
| | | | | 711/162 |
| 2015/0074060 A1* | 3/2015 | Varadharajan | ........ | G06F 16/188 |
| | | | | 707/609 |

OTHER PUBLICATIONS

Zeljko Raden, "Methods of Data Migration", SAGA new frontier group, Nov. 2012, pp. 1-24.

* cited by examiner

MANAGING DATA STORAGE MIGRATION FOR VIRTUAL MACHINES

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly support migration of data objects, such as file systems and LUNs (Logical Unit Numbers, referring also to the units themselves), from one data storage system to another. Migration may be performed for numerous reasons, such as to provide a higher service level, e.g., by hosting data objects from faster disk drives. A storage administrator may direct migration of a data object by selecting the data object on a source data storage system and specifying a destination data storage system as a target. The two data storage systems coordinate to move the contents of the data object from source to destination. After migration, hosts can access the data object from the destination. Some data storage systems include multiple storage pools providing different service levels. Thus, migration may also be performed between different pools of a single data storage system.

Data storage systems may use LUNs to provide storage for virtual machines (VMs). For example, a LUN may store many virtual machine disks. If a VM administrator wishes to obtain a higher service level for one or more VMs whose virtual machine disks are stored on a LUN, the VM administrator may coordinate with a storage administrator, who can migrate the LUN from one data storage system to another, or from one pool to another.

SUMMARY

Recently, virtual machine disks (VMDs) have been developed that do not require LUNs to contain them. Rather, data storage systems may store these virtual machine disks, and hosts may access them, as independent objects. Examples of VMDs of this kind include so-called virtual volumes, or "VVOLs," which are available from VMware of Palo Alto, Calif.

Unfortunately, migration of virtual machine disks can be complex. The people who manage VMs are generally not the same people who manage data storage systems. Thus, administrators of virtual machines may need to coordinate with administrators of data storage systems to effect migrations. In addition, options for migrating virtual machine disks outside the context of LUNs are limited.

In accordance with improvements hereof, a technique for managing data storage for virtual machines in a data storage system includes receiving, from a virtual machine administrative program, a request to operate a virtual machine disk (VMD) at a different service level from one at which the data storage system is currently operating the VMD. In response to receiving the request, the data storage system migrates the VMD from a first set of storage extents providing a first service level to a second set of storage extents providing a second service level.

Advantageously, examples of the disclosed technique allow a virtual machine administrator to effect a change in service level for a VMD via a request to the data storage system. Migration may then proceed transparently to any data storage system administrator, thus resulting in a simpler end-to-end process. As will become apparent, embodiments of the disclosed technique involve additional improvements that confer further benefits and efficiencies.

Certain embodiments are directed to a method of managing data storage for virtual machines (VMs). The method includes storing a VMD (virtual machine disk) on a first set of storage extents. The VMD provides storage for a virtual machine running on a VM server coupled to the data storage system. The first set of storage extents are formed from a first tier of storage devices of the data storage system and providing a first service level. The method further includes receiving, by the data storage system from a virtual machine administrative program (VMAP), a request to operate the VMD at a second service level. In response to receiving the request, the method includes migrating the VMD within the data storage system from the first set of storage extents to a second set of storage extents, the second set of storage extents formed from a second tier of storage devices and providing the second service level.

Other embodiments are directed to a data storage system having control circuitry constructed and arranged to perform a method of managing data storage for virtual machines, such as the method described above. Still other embodiments are directed to a computer program product. The computer program product stores instructions which, when executed by control circuitry of a data storage system, cause the data storage system to perform a method of managing data storage for virtual machines, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing data storage for virtual machines in a data storage system includes receiving, from a virtual machine administrative program, a request to operate a virtual machine disk (VMD) at a different service level from one at which the data storage system is currently operating the VMD. In response to receiving the request, the data storage system migrates the VMD from a first set of storage extents providing a first service level to a second set of storage extents providing a second service level.

Figure 1:
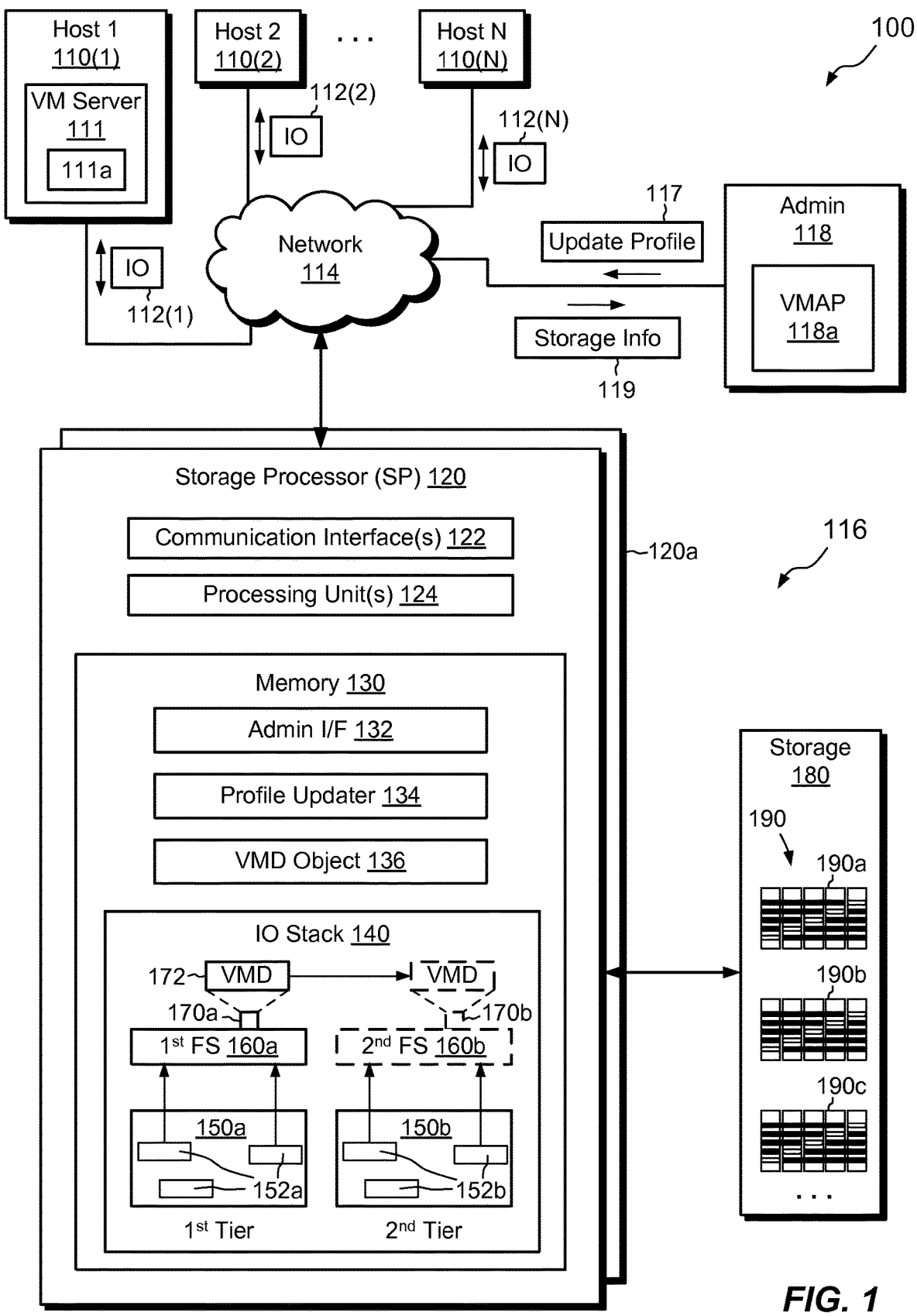
FIG. 1 is a block diagram of an example environment in which embodiments of the disclosed technique hereof may be practiced.

FIG. 1 shows an example environment 100 in which embodiments of the improved technique hereof can be practiced. Here, multiple host computing devices ("hosts"), shown as devices 110(1) through 110(N), as well as an administrative machine 118, access a data storage system 116 over a network 114. The data storage system 116 includes a storage processor, or "SP," 120 and storage 180. The data storage system 116 may include multiple SPs like the SP 120 (e.g., the SP 120 and a second SP 120*a*). It is understood that any number of SPs, may be provided, including a single SP, and the SP 120 can be any type of computing device capable of processing host IOs. These may include physical SPs as well as virtual SPs, i.e., instances of SPs running on a hypervisor in a virtualization environment.

In an example, the storage 180 includes RAID groups 190*a*, 190*b*, and 190*c* (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance. For example, RAID group 190*a* may be composed of a first tier of storage devices on similar magnetic disk drives, RAID group 190*b* may be composed of a second tier of storage devices on similar flash drives, and RAID group 190*c* may be composed of a third storage tier, e.g., on optical drives or other types of drives. Any number of RAID groups and any number of storage tiers may be provided. In addition, each type of storage (e.g., magnetic, flash, optical) may itself provide multiple storage tiers, based on differing performance levels within the respective type.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180. Although the data storage system 116 is capable of receiving and processing both block-based requests and file-based requests, it should be understood that the invention hereof is not limited to data storage systems that can do both.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an administrative interface 132, a profile updater 134, a VMD object 136, and an IO stack 140. The administrative interface 132 manages communication with a virtual machine administrative program (VMAP) 118*a*, which runs on an administrative machine 118. For instance, in a particular arrangement, the administrative interface 132 may include a VASA (vSphere APIs for Storage Awareness) provider for communicating with a VASA host in the VMAP 118*a*. The VMAP 118*a* may be implemented using vCenter Server. VASA and vCenter Server are available from VMware of Palo Alto, Calif. It should be understood, however, that embodiments hereof are not limited to VMware applications or components. The profile updater 134 performs front-end processing for implementing VMD profiles, including changes in those profiles. The VMD object 136 is a software construct that provides information and control for a particular VMD (e.g., VMD 172; see below). For instance, the VMD object 136 may be implemented as an instantiated software object representing a VMD in local orchestration running on the SP 120. The VMD object 136 may have multiple properties, reflecting the VMD's profile, for example, as well as other settings. The VMD object 136 may also support multiple methods for performing various activities, such as migration, which the data storage system 116 can carry out in connection with the VMD. Each VMD operating in the data storage system 116 may have its own instantiated VMD object 136, and different instantiated VMD objects may be based on a common object model.

The IO stack 140 provides an execution path for host IOs (e.g., IO requests 112(1-N)). Here, it is seen that the IO stack 140 includes a first storage pool 150a and a second storage pool 150b. The first storage pool 150a manages a first set of storage extents 152a. The first set of storage extents 152a belong to a first storage tier and provide a first service level. In an example, the first set of storage extents 152a are derived from magnetic disk drives (e.g., from RAID group 190a). As further seen in FIG. 1, the second storage pool 150b manages a second set of storage extents 152b. The second set of storage extents 152b belong to a second storage tier and provide a second service level. In an example, the second set of storage extents 152b are derived from electronic flash drives (e.g., from RAID group 190b). It should be understood that the terms "first storage tier" and "second storage tier" are used herein merely for identification. No suggestion as to quality of service storage is intended to be implied by the terms indicated.

FIG. 1 further shows a first file system 160a, which is built upon the first storage pool 150a. For example, the first file system 160a is built upon a volume formed from the first set of storage extents 152a. The first file system 160a includes a first file 170a. Thus the file 170a is also built upon the first set of storage extents 152a. The first file 170a stores a complete realization of a VMD 172. Any data and metadata of the VMD 172 are all stored together within the file 170a. The IO stack 140 exposes the file 170a, via appropriate mapping and protocol endpoints, to the hosts 110(1-N).

In example operation, hosts 110(1-N) issue IO requests 112(1-N) to the data storage system 116 over the network. The IO requests 112(1-N) specify data to be written to and/or read from data objects served from the data storage system 116. These data objects include the VMD 172 realized within the file 170a. In an example, a VM server 111 running on host 110(1) operates a virtual machine 111a, and the virtual disk for virtual machine 111a is the VMD 172. During its normal operation, the virtual machine 111a reads and writes from the VMD 172 to perform its various functions. The VM server 111 is a platform for hosting virtual machines. In an example, the VM server 111 is implemented using ESXi from VMware; however, other virtual machine platforms may be used.

At some point, which may be either while the VM 111a is actively running or when it is shut down, a virtual machine administrator operates the VMAP 118a to view a storage profile for VMD 172. In an example, the storage profile for VMD 172 indicates that VMD 172 is served from storage pool 150a of a particular service level. The service level may be specified, for example, as one of Gold, Silver, or Bronze, with Gold providing the highest quality of service and Bronze providing the lowest. Quality of service may be measured in various ways, such as using throughput, latency, and/or any other storage metric. Here, for example, the profile for VMD 172 indicates a Silver service level.

The virtual machine administrator, who may wish to improve the performance of virtual machine 111a, may operate the VMAP 118a to upgrade the service level of VMD 172 from Silver to Gold. In response to the administrator's action, the VMAP 118a sends an update-profile request 117 to the data storage system 116. The data storage system 116 receives the request 117 and processes its content at the administrative interface 132. Then, for example, the profile updater 134 examines the request 117 and determines whether any configuration change is needed to satisfy the request 117. For example, the profile updater 134 performs a testing operation to determine whether providing the Gold service level requires migrating the VMD 172. If not, the profile updater 134 may direct other changes to meet the Gold service level. But if the testing operation indicates that migration is required, the profile updater 134 directs the VMD object 136 to conduct the required migration. As will be described more fully in connection with the figures that follow, migration of VMD 172 entails creating a second file system 160b on storage pool 150b, such that the second file system 160 is built from the second set of storage extents 152b, and creating of a second file 170b within the second file system 160b. The second file 160b is thus also supported by the second set of storage extents 152b. Migration further entails copying the contents of file 170a to file 170b, providing mapping and host access for the file 172b, and directing IO requests for VMD 172 to the second file 170b. The first file 170a and the first file system 170b may then be destroyed, as they are no longer required for serving the VMD 172.

In the manner described, migration of VMD 172 from Silver to Gold is achieved via profile-update request 117 issued from the VMAP 118a at the direction of the virtual machine administrator. No separate storage administrator (e.g., administrator of the data storage system 116) needs to be involved. Rather, the virtual machine administrator is able to effect migration directly from the VMAP 118a. In requesting the profile update from Silver to Gold, the virtual machine administrator need not even know whether a migration will take place. In an example, the testing operation and subsequent migration happen out of view of the virtual machine administrator. At the conclusion of migration, the administrative interface 132 may respond to polling from the VMAP 118a by obtaining updated storage information 119 from the VMD object 136 for the VMD 172 and providing the updated information to the VMAP 118a. In an example, the updated storage information 119 identifies the new storage pool 150b for hosting the VMD 172 and the current service level of Gold. Although the example provided above states that a virtual administrator initiates the request 117, it should be understood that the request 117 may alternatively be provided automatically, e.g., in response to the VMAP 118a detecting that the VM 111a is being heavily utilized. Thus, the example described is merely illustrative.

Further, it should be understood that storage profiles may specify additional features besides service levels, such as replication settings, snap settings, and other storage-related settings, and that changes in these settings may be carried out using a similar transactional scheme as the one presented herein for changing service level.

Figure 2:
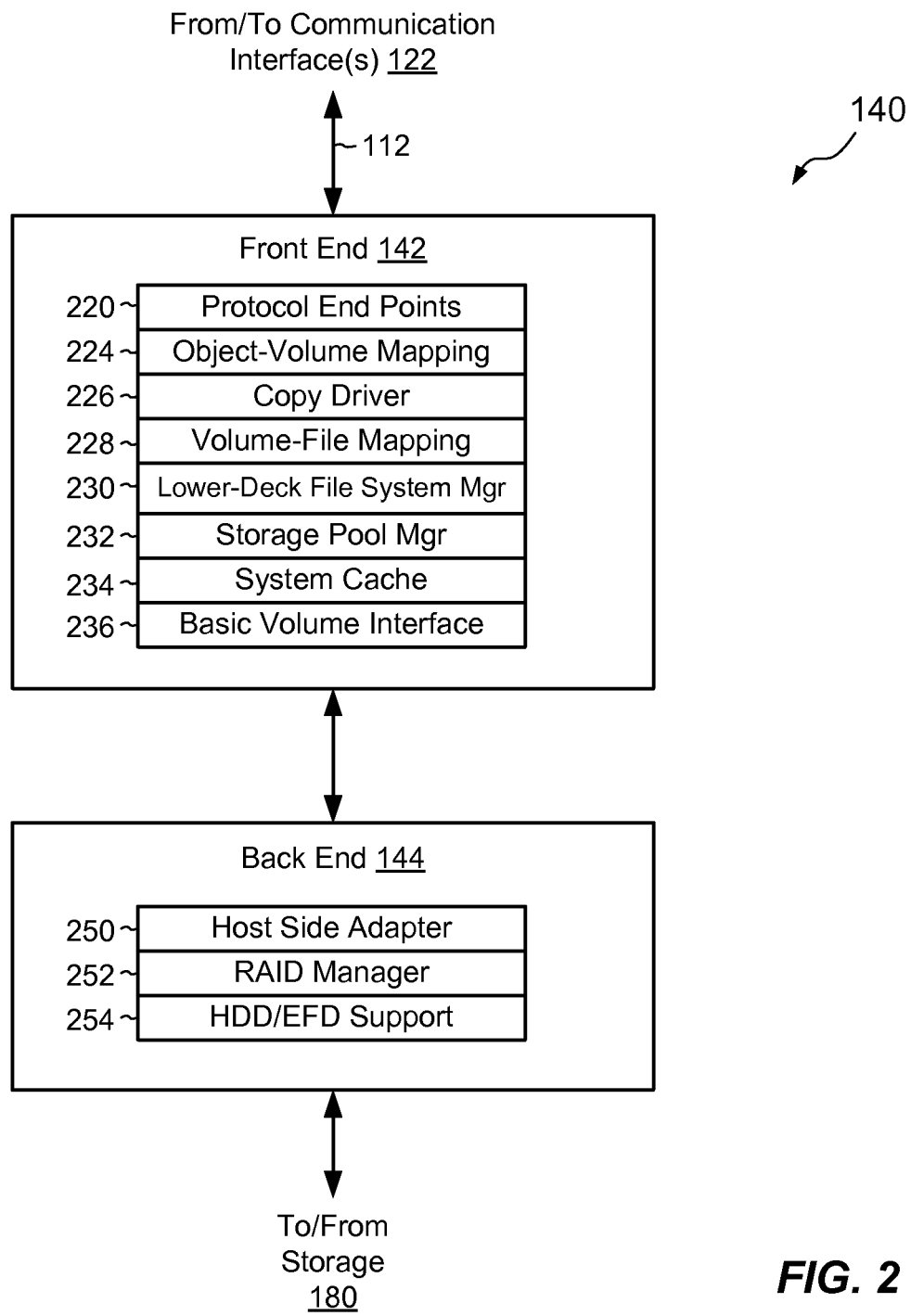
FIG. 2 is a block diagram of the an IO stack of FIG. 1 in additional detail.

FIG. 2 shows features of the example IO stack 140 of FIG. 1 in additional detail. The inclusion of FIG. 2 herein is intended to provide example context for the disclosed embodiments.

As shown in FIG. 2, the IO stack 140 includes a front end 142 and a back end 144. The front end 142 and back end 144 may be operated together on the same SP, or may be operated on different SPs, e.g., in a modular arrangement. Further, the front end 142 may be connected directly to a separate block-based array, e.g., in a gateway arrangement, with back-end functionality provided by the block-based array.

The front end 142 is seen to include, from top to bottom, protocol end points 220, an object-volume mapping layer 224, a copy driver 226, a volume-file mapping 228, a lower-deck (internal) file system manager 230, a storage pool manager 232, a system cache 234, and a basic volume interface 236.

The back end 144 is seen to include a host side adapter 250, a RAID manager 252, and hard disk drive/electronic flash drive support 254. Although IO requests 112 enter the IO stack 140 from the top and propagate down (from the perspective of FIG. 2), the components of the IO stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups 190 and provides access to the RAID groups 190 using RAID protocols. The RAID manager 252 also expresses RAID groups 190 in the form of internal LUNs (not shown). The host side adapter 250 provides an interface to the front end 142, for implementations in which the front end 142 and back end 144 are run on different machines or SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different machines or SPs. The basic volume interface 236 may also be disabled in the arrangement shown in FIG. 1.

The system cache 234 provides data caching services. For example, the system cache 234 caches data written from IO requests 112 to the VMD 172. During migration, the system cache 234 participates in moving data from the first file 170a to the second file 170b. In an example, the system cache 134 is implemented in DRAM (Dynamic Read-Only Memory) and is mirrored across SPs, e.g., between SP 122 and SP 122a. In some examples, the system cache 234 is battery-backed to provide persistence in the event of a power loss.

The storage pool manager 232 organizes elements of the storage 180 in the form of storage extents, such as storage extents 152a and 152b. In an example, the storage extents are provided in the form of slices. A "slice" is an increment of storage space, such as 256 MB or 1 GB in size, which is composed from a portion of an internal LUN. The pool manager 232 may allocate slices to lower-deck file systems from storage pools (e.g., 150a and 150b) to support the storage of data objects. The pool manager 232 may also deallocate slices from lower-deck file systems if storage provided by those slices is no longer required.

The lower-deck file system manager 230 builds and manages internal, lower-deck file systems (like file systems 160a and 160b) upon slices served by the storage pool manager 232. In some examples, lower-deck file systems can realize both block-based objects and file-based objects in the form of files, like the files 170a and 170b (FIG. 1). The data storage system 116 may include any number of lower-deck file systems, and each lower-deck file system may include any number of files. In a typical arrangement, a different lower-deck file system is provided for each data object to be stored. Each lower-deck file system includes one file that realizes the data object itself and, in some instances, includes other files that realize snaps of the file that stores the data object. Some implementations allow for storing additional files. Each lower-deck file system has an inode table. The inode table provides a different inode for each file stored in the respective lower-deck file system. Each inode stores properties of a respective file, such as its ownership and size, and includes information for accessing the file's data.

The volume-file mapping 228 maps each file realizing a data object to a respective internal volume (or LUN). Higher levels of the IO stack 140 can then access the internal volume using block-based semantics. The volume-file mapping can be achieved in a variety of ways. According to one example, a file realizing a data object is regarded as a range of blocks, and the range of blocks is expressed as a corresponding range of logical offsets into the file. Because volumes are accessed based on identifier (logical unit number) and offset, the volume-file mapping 228 can establish a one-to-one correspondence between logical offsets into a file and physical offsets into the corresponding internal volume, thus providing the requisite translation needed to express the file in the form of a volume.

The copy driver 226 provides fast copy services between lower-deck file systems. In an example, the copy driver 226 works in coordination with system cache 234 to perform efficient copying without the aid of additional buffers. Such copies may be made between lower-deck file systems, between storage pools, and between SPs. In an example, the copy driver 226 includes different driver components, one per data object, and each component may be created and/or destroyed based on whether access to the respective data object is required.

The object-volume mapping layer 224 maps internal volumes to respective host-accessible data objects, such as host LUNs, host file systems, and VMDs, for example.

The protocol end points 220 expose the underlying data objects to hosts in accordance with respective protocols for accessing those data objects. Thus, the protocol end points 220 may expose block-based objects (e.g., LUNs and block-based VMDs, e.g., block-base VVOLs) using Fiber Channel or iSCSI and may expose file-based objects (e.g., host file systems and file-based VMDs, e.g., file-based VVOLs) using NFS, CIFS, or SMB 3.0, for example.

Figure 3:
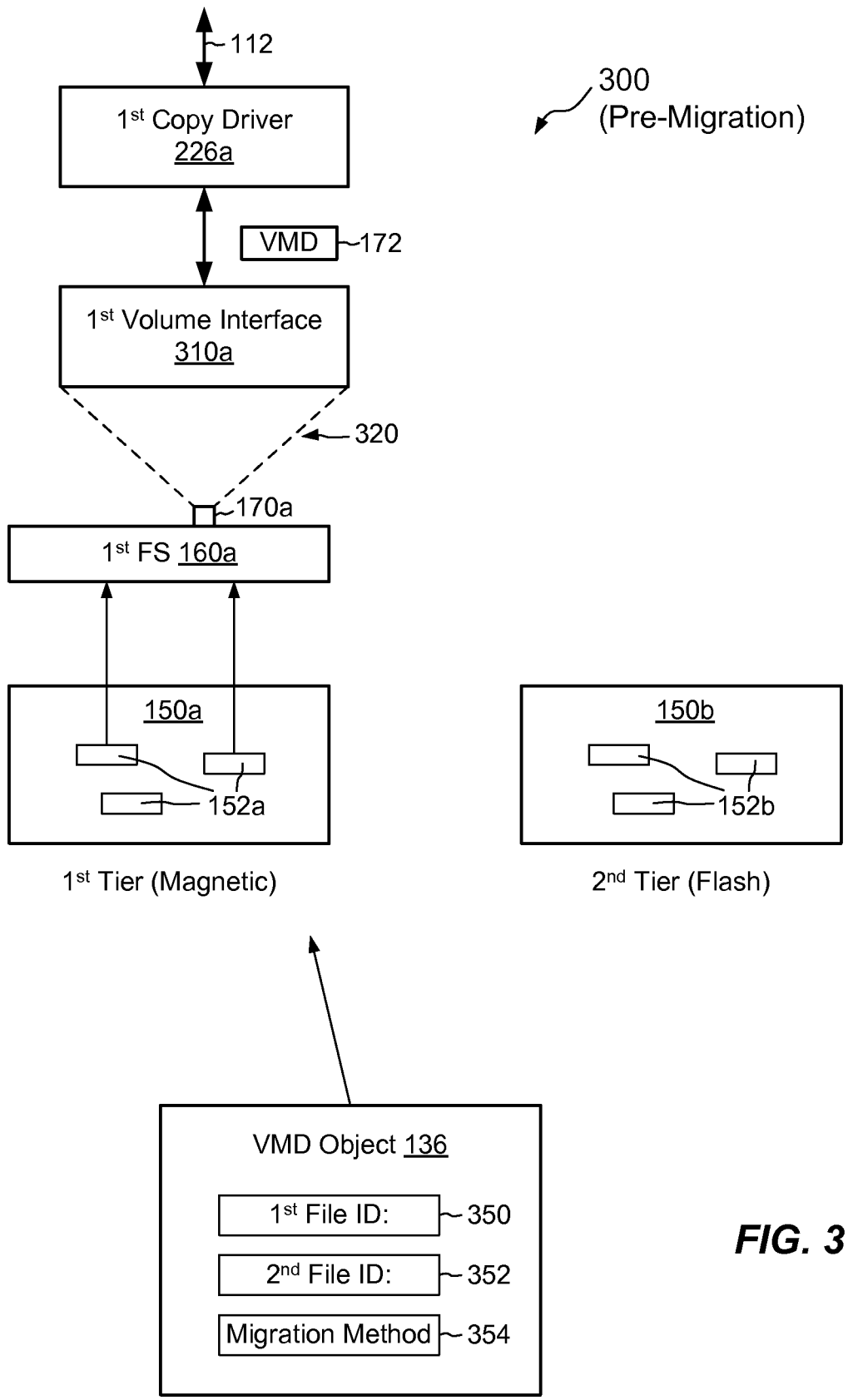
FIG. 3 is a block diagram showing example data storage system structures prior to performing migration on a virtual machine disk (VMD)

FIG. 3 shows an example arrangement 300 of components prior to beginning migration on the VMD 172. For example, the arrangement 300 may reflect a state of the data storage system 116 just prior to the virtual machine administrator issuing the profile-update request 117. In this example, it is assumed that the virtual machine 111a (FIG. 1) is operative and actively accessing the VMD 172, e.g., via IO requests 112.

It is seen that the first file 170a has a first volume interface 310a. The first volume interface 310a has an attachment 320 to the first file 170a and provides a binding between the first file 170a and a protocol endpoint 220 (FIG. 2). The binding allows a server (e.g., VM server 111) to access the first file 170a for reading and/or writing via that protocol endpoint. In an example, the first volume interface 310a also performs functions of the object-volume mapping 224 (FIG. 2), to express the first file 170a as VMD 172.

The first volume interface 310a accesses its protocol endpoint via a first copy driver 226a (i.e., a component of copy driver 226—FIG. 2). In an example, the first copy driver 226a is installed automatically when the first volume interface 310a is established. As no copying is currently taking place, the first copy driver 226a may simply perform a pass-through function for IO requests 112 at this time.

In an example, the first volume interface 310a and the first copy driver 226a are established prior to migration only when the virtual machine 111a (FIG. 1) is operational. When the virtual machine 111a is shut down, the first volume interface 310a and the first copy driver 226a may not be present.

Figure 4:
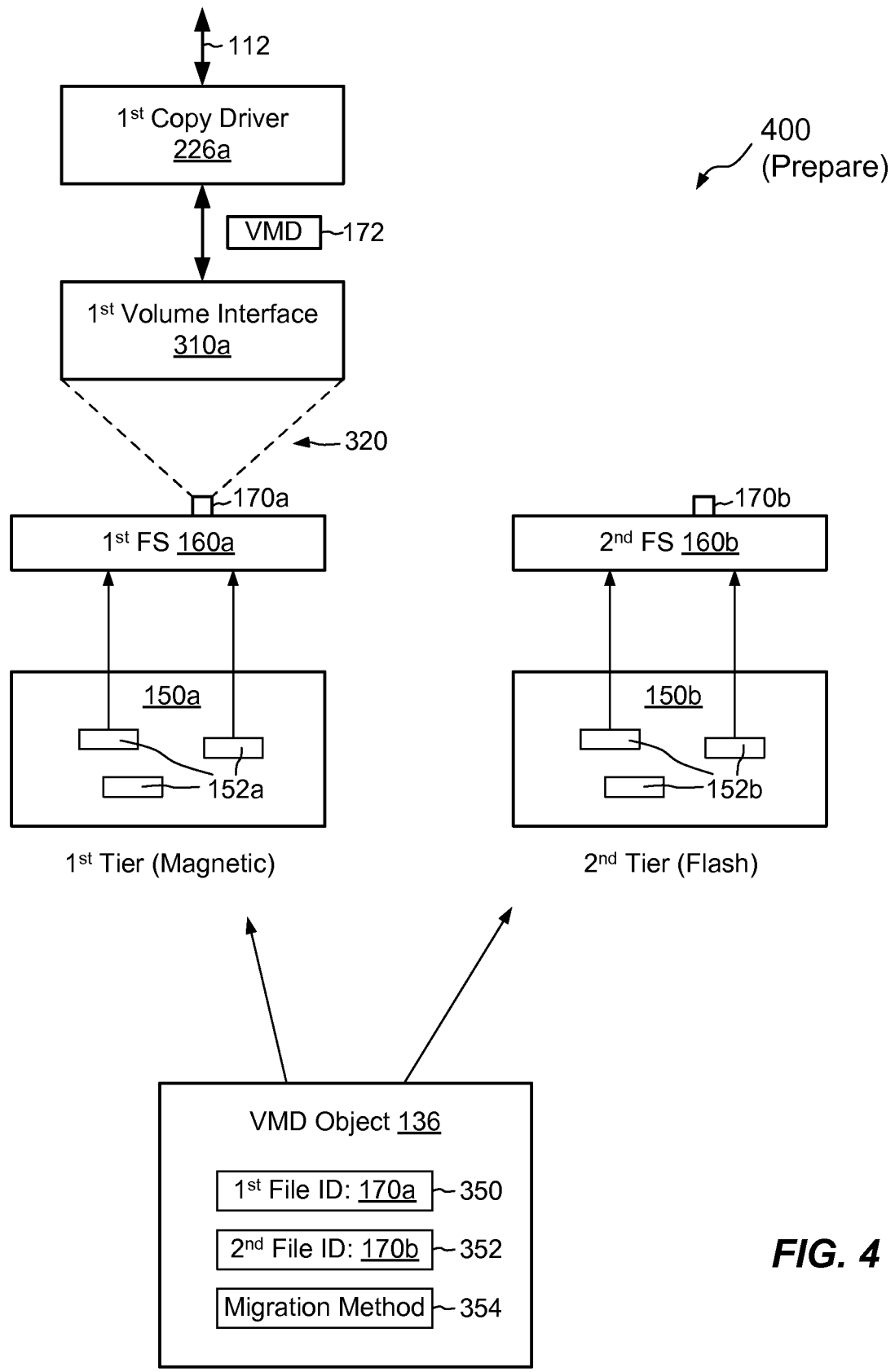
FIG. 4 is a block diagram showing example data storage system structures during a preparation phase of migrating the VMD.

FIG. 4 shows an example arrangement 400 of components during a preparation phase of migration. Here, the VMD object 136 performs a prepare operation. The prepare operation includes, for example, generating the second file system 160b on the second storage pool 150b and creating the second file 170b within the second file system 160b. In some examples, the second file system may already exist, such that the preparation operation creates the second file 170b on the already-present second file system 160b. It can be seen that the VMD object 136 specifies multiple properties, which include a first file identifier 350 and a second file identifier 352. The first file identifier 350 and the second file identifier 352 respectively identify a source file and a destination file to be used when performing migration. The VM object 136 also supports a migration method 354. The migration method 354 includes program code for directing and orchestrating migration. As the VM object 136 represents VMD 172, the migration method 354 includes program code for migrating the VMD 172 from the first file 170a to the second file 170b. In an example, this program code includes instructions for performing each of the phases of migration, which, as will be described, include, for example, preparation, binding, copying, committing, and cleanup.

Figure 5:
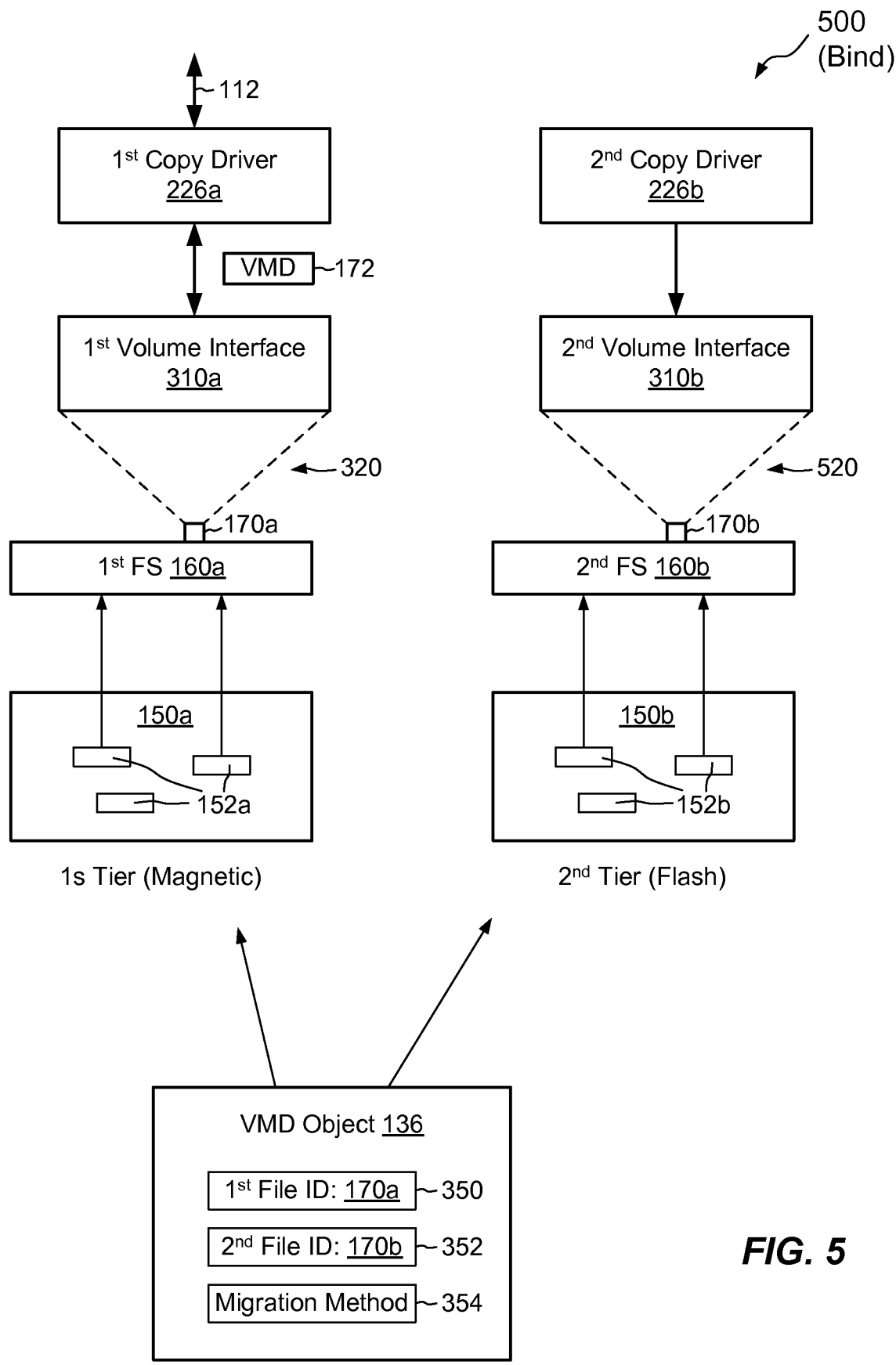
FIG. 5 is a block diagram showing example data storage system structures during a binding phase of migrating the VMD.

FIG. 5 shows an example arrangement 500 during a binding phase of migration. Here, the VMD object 136 performs a binding operation. The binding operation creates a second volume interface 310b and a second copy driver 226b. Here, the second volume interface 310b binds the second file 170b to the second copy driver 226b. An attachment 520 establishes a connection between the second file 170b and the second volume interface 310b. In an example, this binding does not establish an access path to any protocol endpoint. Rather, the binding is internal and there is no direct host access to the file 170b via the second volume interface 310b.

If the virtual machine 111a was shut down, instead of active as in the illustrated example, the first volume interface 310a and the first copy driver 226a would also be created at this time, with an internal binding formed between the first volume interface 310a and the first copy driver 226a.

In an example, the binding operation shown in FIG. 5 is intended to cover creation of both the first and second volume interfaces 310a and 310b and creation of both the first and second copy drivers 226a and 226b. This is the case regardless of the time at which these objects are created and regardless of whether they are created at the same time (e.g., when the VM 111a is offline) or at different times (e.g., when the VM 111a is online). When the VM 111a is offline, migration may proceed without regard to disrupting the VM 111a. When the VM 111a is online, however, migration may proceed non-disruptively, such that service to the VM 111a may proceed without interruption.

Figure 6:
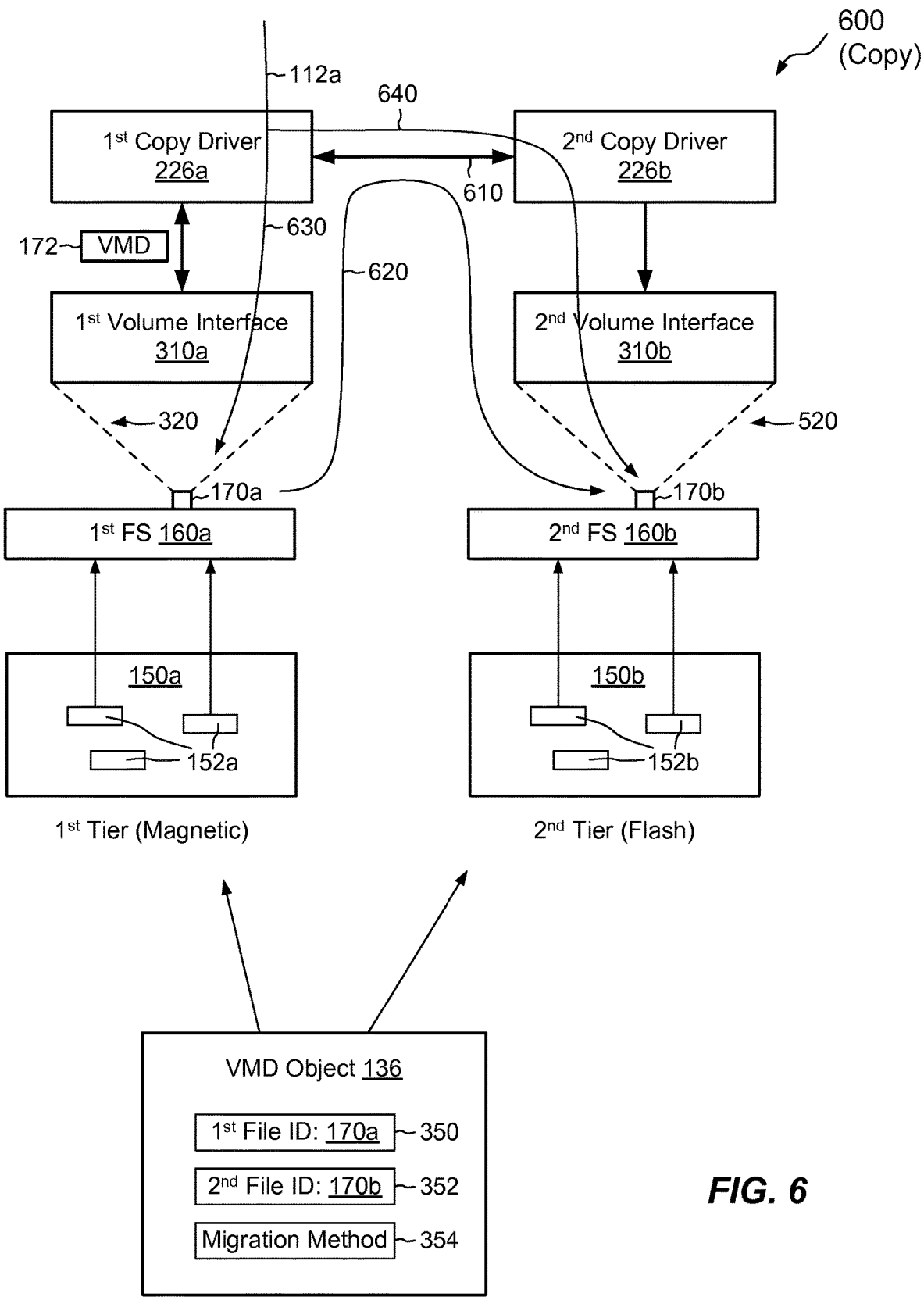
FIG. 6 is a block diagram showing example data storage system structures during a copy phase of migrating the VMD.

FIG. 6 shows an example arrangement 600 during a copying phase of migration. Here, the VMD object 136 performs a copy operation. The copy operation includes creating a copy session 610 between the first copy driver 226a and the second copy driver 226b. The copy session 610 enables the first copy driver 226a and the second copy driver 226b to work cooperatively in copying the contents of the first file 170a to the second file 170b. For example, the first copy driver 226a reads data from the first file 170a, via the first volume interface 310a, and conveys the data to the second copy driver 226b via the copy session 610. The second copy driver 226b then writes the data to the second file 170b via the second volume interface 310b. This copy operation continues, with data flowing in the manner shown by arrow 620, until all of the data of the first file 170a have been copied to the file 170b.

During the online condition, i.e., when VM 111a is running, the VM 111a may continue to issue IO requests 112a to the VMD 172. Read requests may pass directly to the first file 170a, for servicing in the usual manner. For write requests, however, the first copy driver 226a may direct the data to be written to both the first file 170a (e.g., via path 630 through the first volume interface 310a) and to the second file 170b (via path 640 through the second copy driver 226b and the second volume interface 310b). It should be understood, however, that the above-described approach for handling IO request 112a that arrive during the copying phase may be varied depending on copy status, whether the locations being written or read have yet been copied, and other factors. The example described is merely illustrative.

Figure 7:
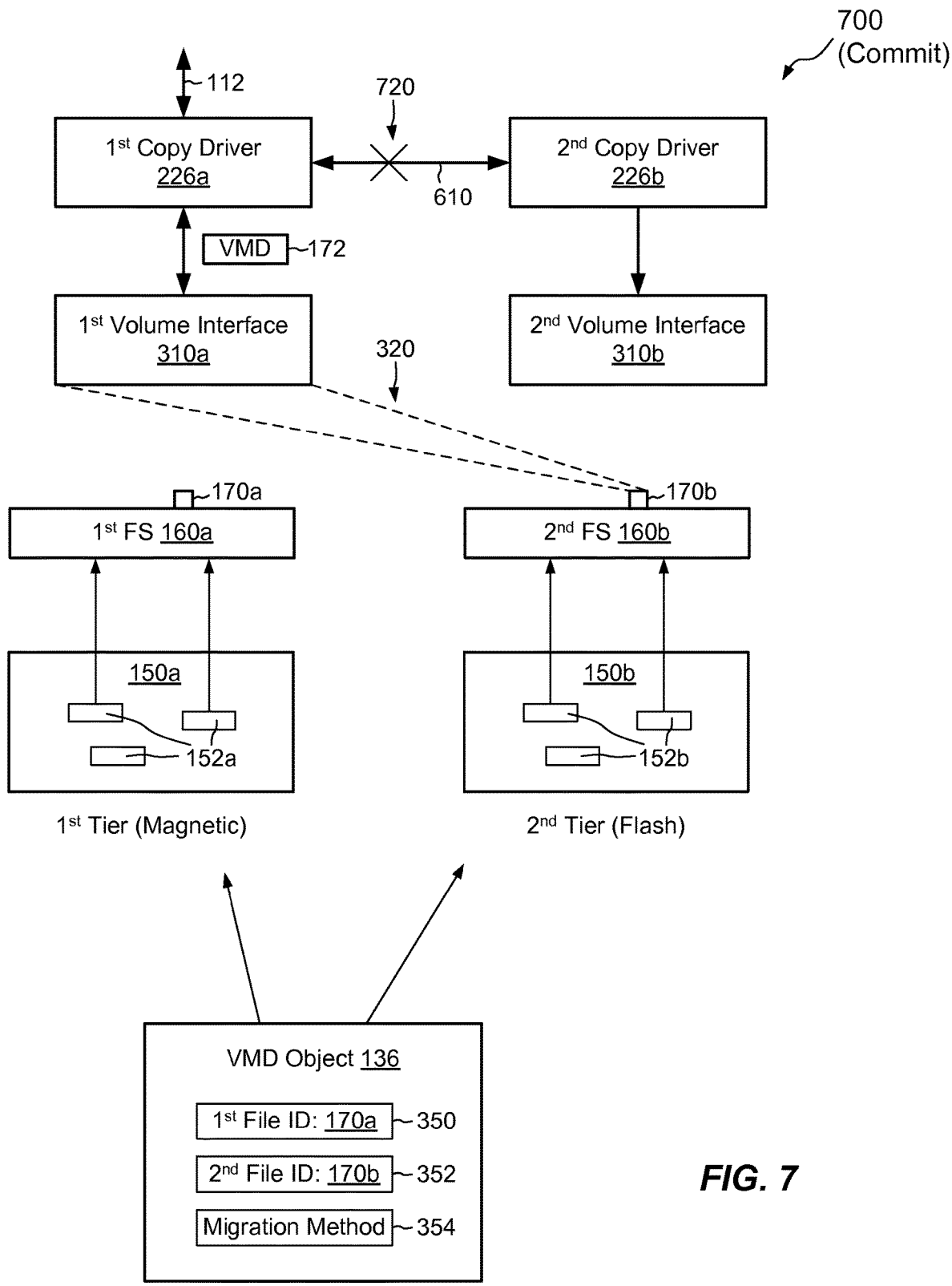
FIG. 7 is a block diagram showing example data storage system structures during a commit phase of migrating the VMD.

FIG. 7 shows an example arrangement 700 during a committing phase of migration. Here, the VMD object 136 performs a commit operation. The commit operation includes destroying the attachment 520 (FIG. 5) and switching the attachment 320 of the first volume interface 310a from the first file 170a to the second file 170b. The first volume interface 310 thus provides binding of the second file 170b to the same protocol endpoint (or endpoints) to which the first file 170a was previously bound. Also at this time, the copy session 610 may be terminated, as indicated with X-mark 720. Although the committing operation is typically fast, it may be desired in some examples to pause IO requests 112 momentarily while the commit operation is being performed. IO requests 112 can be resumed thereafter; however, such IO requests 112 will be directed to the second file 170b rather than to the first file 170a.

At the conclusion of the commit operation, the migration of VMD 172 is complete, except for cleanup activities. The VMD 172 is now served from the second storage tier, which provides the Gold service level, and performance of the virtual machine 111a can be expected to improve.

Figure 8:
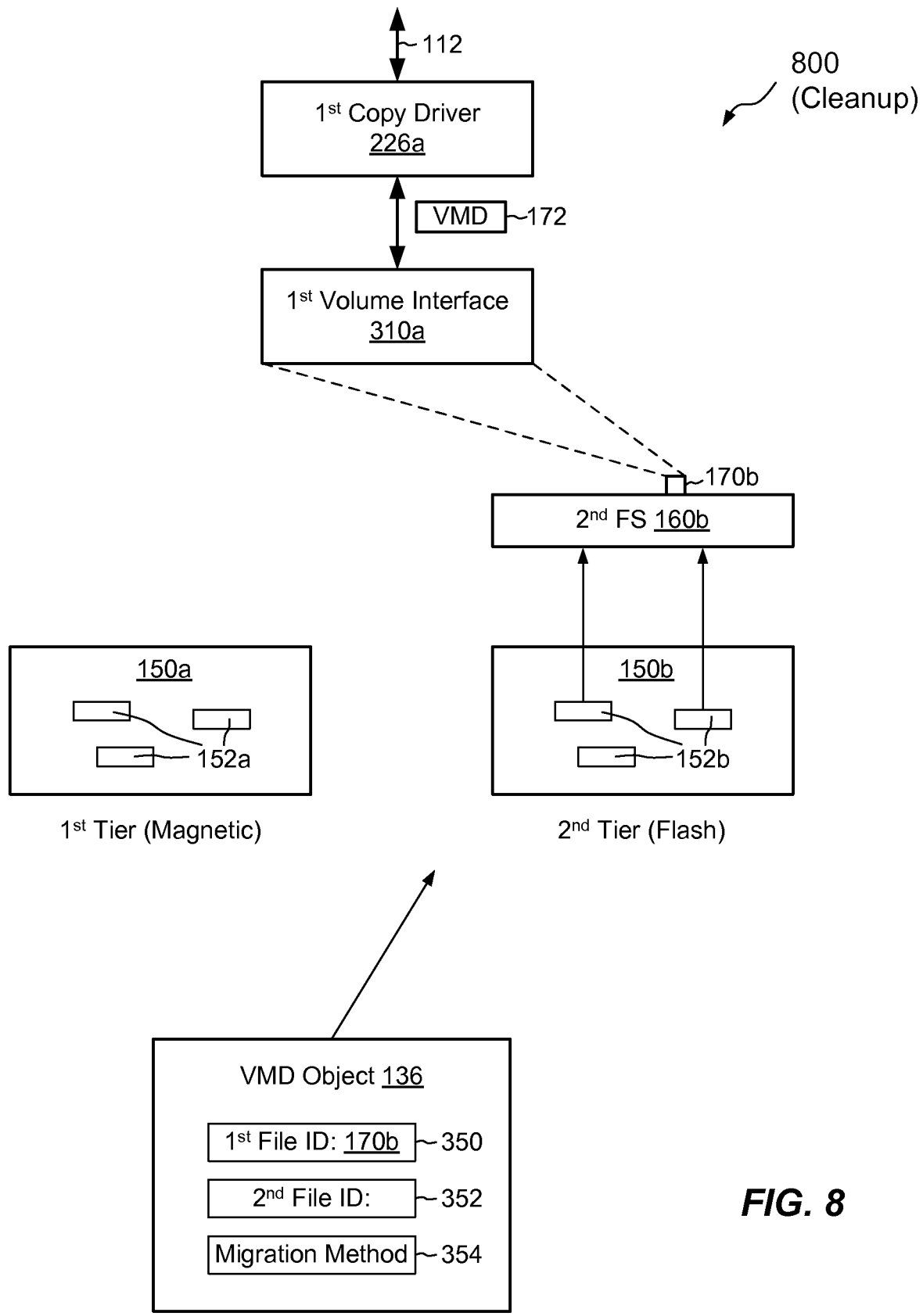
FIG. 8 is a block diagram showing example data storage system structures during a cleanup phase of migrating the VMD.

FIG. 8 shows a cleanup phase. Here, the first file 170a and the first file system 160a are both deleted. The first set of storage extents 152a has been returned to the storage pool 150a, where the extents 152a may be recycled for use with other data objects. In addition, the second copy driver 226b and the second volume interface 310b have been destroyed, thus freeing the memory and any backend storage that they occupied. The migration method 354 running in the VM object 136 completes its operation. In some examples, the first file system 160 may be in use for other purposes besides serving the VMD 172. In such cases, the cleanup operation does not delete the first file system 160a but rather leaves it in place.

Figure 9:
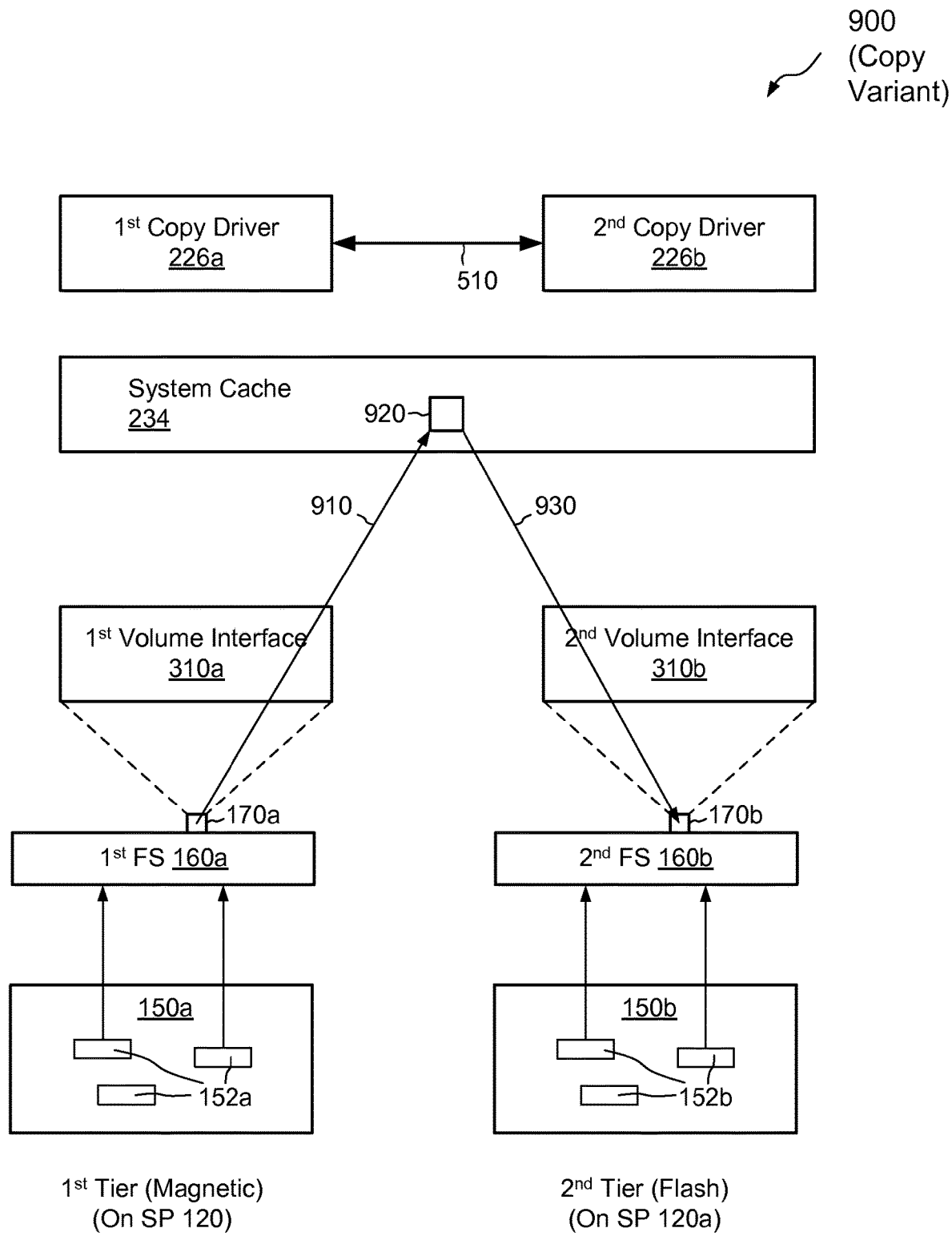
FIG. 9 is a block diagram showing an example caching arrangement during the copy phase of migrating the VMD.

FIG. 9 shows an example arrangement 900 for efficiently copying data from the first file 170a to the second file 170b during the copy operation shown in FIG. 6. Here, the first copy driver 226a directs a read operation 910 of data from the first file 170a into a page 920 of system cache 234 and marks the page 920 as dirty. The second copy driver 226b updates a tag for page 920 that identifies a storage location at which to place the copied data in the second file 170b. When the system cache 234 flushes the dirty page 920, the copied data is written directly to the storage supporting the second file 170b (i.e., storage in the second set of storage extents 152b. Copying the contents of the first file 170a to the second file 170b is thus achieved by performing multiple cache reads (910) and writes (930) like this one until all the data of the file 170a have been copied.

It should be appreciated that this cache-mediated variant of the copy operation of FIG. 6 promotes efficiency by avoiding memory-to-memory copies. For example, separate memory buffers (e.g., one for the first file 170a and another for the second file 170b) are not involved in the copy operation. Rather, the path for copied data is from the first file 170a to the system cache 234 and then to the second file 170b. This is the case even though the first file 170a and the second file 170b are served from different pools (150a and 150b). In addition, the disclosed arrangement can operate across different storage processors in the data storage system 116. For instance, if the first storage pool 150a is served from SP 120 and the second storage pool 150b were served from SP 120a, instead of from SP 120 (as shown in FIG. 1), then the above-described buffer-free copy scheme could still be used, as the system cache 234 is mirrored across storage processors such that the cache pages available to SP 120 are also available to SP 120a.

Figure 10:
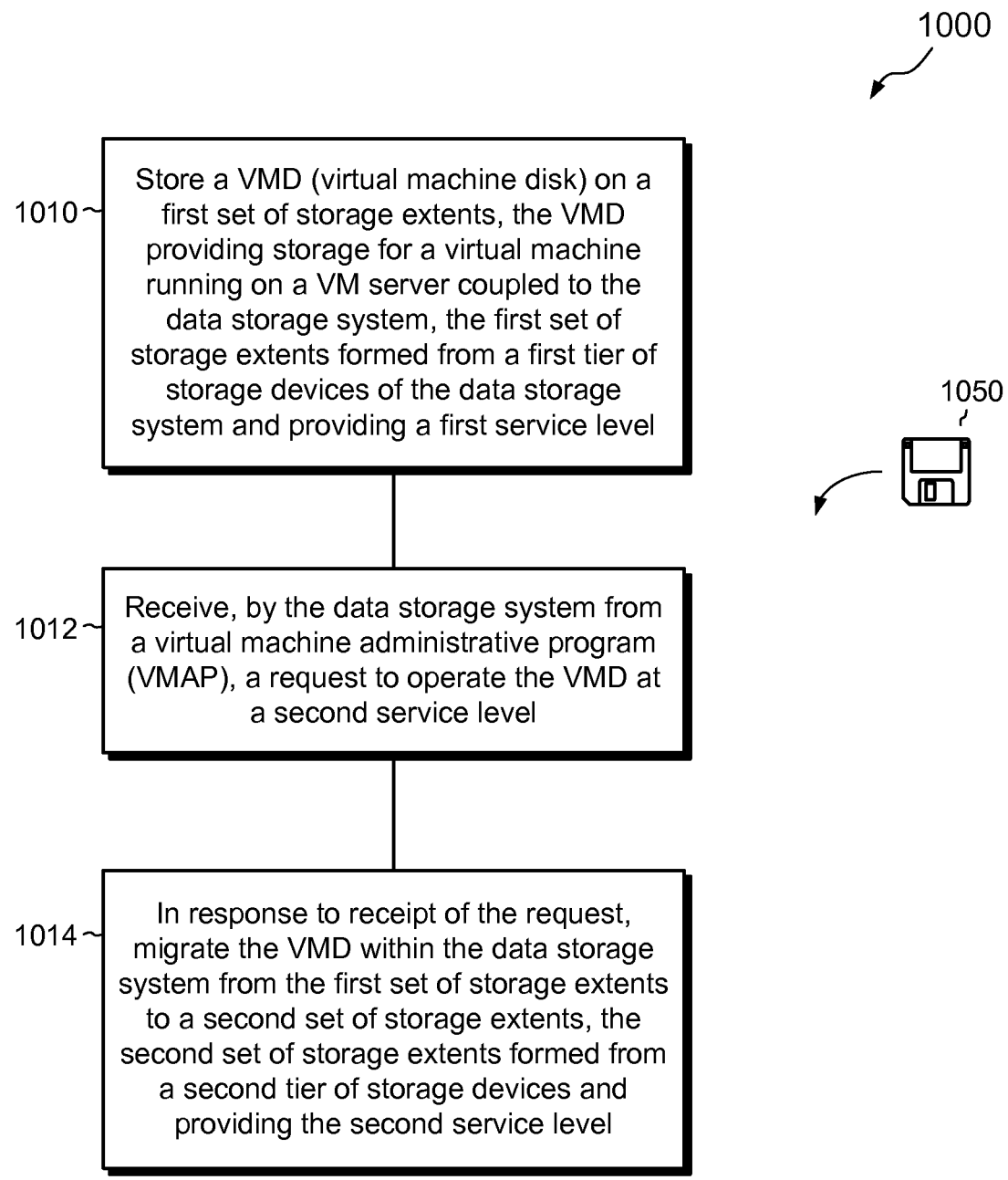
FIG. 10 is a flowchart showing an example method for managing data storage for virtual machines.

FIG. 10 shows an example process 1000 for managing data storage for virtual machines and provides a summary of certain activities described above. The process 1000 may be carried out, for example, in connection with the environment 100, e.g., by the software constructs described in connection with FIGS. 1-9, which reside in the memory 130 of SP 120 (and/or SP 120a) and are run by the set of processing units 124. The various acts of the process 1000 may be ordered in any suitable way. Accordingly, embodiments may be constructed in which acts are performed in orders different from that illustrated, which may include performing some acts simultaneously, even though the acts are shown as sequential in the illustrated embodiments.

At 1010, a VMD (virtual machine disk) is stored on a first set of storage extents. The VMD provides storage for a virtual machine running on a VM server coupled to the data storage system. The first set of storage extents is formed from a first tier of storage devices of the data storage system and provides a first service level. For example, storage extents 152a provide storage for VMD 172 (FIG. 1, via file system 160a and file 170a) and are formed from the first storage tier (e.g., magnetic disk drives) in the storage 180 of the data storage system 116. VMD 172 provides storage for virtual machine 111a running on VM server 111. In this example, the first storage tier provides the Silver service level.

At 1012, the data storage system receives, from a virtual machine administrative program (VMAP), a request to operate the VMD at a second service level. For example, a virtual machine administrator operates VMAP 118a on administrative machine 118 to issue an update-profile request 117. The update-profile request 117 specifies a change in service level for VMD 172 from Silver to Gold. The data storage system 116 receives the request 117.

At 1014, in response to receiving of the request, the VMD is migrated within the data storage system from the first set of storage extents to a second set of storage extents. The second set of storage extents is formed from a second tier of storage devices and provides the second service level. For example, the data storage system 116 responds to request 117 by migrating the VMD 172 from the first storage pool 150a, which includes storage extents 152a from the first tier, to the second storage pool 150b, which includes storage extents 152b from the second tier. In an example, migration of VMD 172 involves multiple operations, such as prepare, bind, copy, commit, and cleanup operations, which are orchestrated by a VMD object 136. The data storage system 116 may query the VMD object 136 in response to polling from the VMAP 118, and the VMD object 136 may provide updated profile information 119, which the data storage system 116 may return to the VMAP 118a.

An improved technique has been described for managing data storage for virtual machines in a data storage system 116. The technique includes receiving, from a virtual machine administrative program (VMAP 118a), a request 117 to operate a virtual machine disk (VMD 172) at a different service level from one at which the data storage system is currently operating the VMD (e.g., from Silver to Gold). In response to receiving the request 117, the data storage system 116 migrates the VMD 172 from a first set of storage extents 152a providing a first service level (Silver, via the first storage tier) to a second set of storage extents 152b providing a second service level (Gold, via the second storage tier).

Having described certain embodiments, numerous alternative embodiments or variations can be made. For example, the disclosed embodiments show the data storage system 116, VM server 111, and VMAP 118a all running on different machines on the network 114. However, this is merely an example. For instance, the VM server 111 and the VMAP 118a may be provided together on a single machine.

Also, although the disclosed example specifies a change in service level from Silver to Gold, it should be understood that changes may be made in similar ways between any two service levels. The service levels themselves need not be specified using terms like Bronze, Silver, and Gold, but rather may be indicated in any suitable way that identifies quality of service. Also, although the change in the illustrated example was from a lower service level to a higher service level, changes in service level may also be conducted from higher service levels to lower ones, e.g., to better allocate the fastest storage to the most critical applications.

Also, although the examples provided show migration of VMD 172 from a first storage pool 150a to a second storage pool 150b, it should be understood that migration may also take place within a single storage pool. For instance, the first storage pool 150a may include both the first set of storage extents 152a and the second set of storage extents 152b, such that migration of VMD 172 from the first set of storage extents 152a to the second set of storage extents 152b takes place entirely within the first pool 150a.

Also, although a particular migration process has been described in connection with VMDs, which involves prepare, bind, copy, commit, and cleanup operations, this disclosed migration process is not limited to VMDs. For example, a similar process may be carried out for migrating LUNs, host file systems, or any data object contained within a file in a file system. It should be understood that LUNs and host file systems may not require binding to protocol endpoints. Otherwise, migration may proceed as described above for VMDs. In these cases, rather than a VMD object 136 orchestrating migration, a similarly constructed LUN object or file system object may perform an analogous role.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 1050 in FIG. 10). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing data storage for virtual machines (VMs), the method comprising:
    storing a VMD (virtual machine disk) on a first set of storage extents, the VMD providing storage for a virtual machine running on a VM server coupled to a data storage system, the first set of storage extents formed from a first tier of storage devices of the data storage system and providing a first service level;
    receiving, by the data storage system from a virtual machine administrative program (VMAP), a request to operate the VMD at a second service level; and
    in response to receiving the request, migrating the VMD within the data storage system from the first set of storage extents to a second set of storage extents, the second set of storage extents formed from a second tier of storage devices and providing the second service level, the second set of storage extents being distinct from the first set of storage extents, the first tier including storage drives of a first type, the second tier including storage drives of a second type different from the first type,
    wherein the method further comprises, after receiving the request and prior to migrating the VMD, performing a testing operation configured to (i) produce a first result in response to determining that providing the second service level requires migrating the VMD and (ii) produce a second result in response to determining that providing the second service level does not require migrating the VMD,
    wherein migrating the VMD is performed in response to the testing operation producing the first result,
    wherein the method further comprises, after migrating the VMD, updating the VMAP with new storage information about the VMD, and
    wherein migrating the VMD includes performing prepare, bind, copy, commit, and cleanup migration operations on the VMD under direction of a single VMD object instantiated from a common VMD object model, the VMD object being a software construct having multiple properties and supporting multiple operations for the VMD.

2. The method of claim 1,
    wherein the VMD is realized within a first file,
    wherein the first file is part of a first file system,
    wherein the first file system is supported by a first storage pool within the data storage system, the first storage pool providing the first service level and including the first set of storage extents, and
    wherein the first set of storage extents is provisioned from the first storage pool to the first file system to support storage of the VMD in the first file.

3. The method of claim 2, wherein migrating the VMD includes performing a prepare operation, the prepare operation including:
    generating a second file system supported by a second storage pool within the data storage system, the second storage pool providing the second service level and including the second set of storage extents; and
    creating a second file within the second file system.

4. The method of claim 3, wherein migrating the VMD further includes performing a bind operation, the bind operation including:
    creating a first volume interface and a first copy driver, the first volume interface enabling read/write access to the first file by the first copy driver; and
    creating a second volume interface and a second copy driver, the second volume interface enabling read/write access to the second file by the second copy driver.

5. The method of claim 4, wherein migrating the VMD further includes performing a copy operation, the copy operation including:
    establishing a copy session between the first copy driver and the second copy driver to enable copying of contents of the first file to the second file; and
    copying, via the copy session, the contents of the first file to the second file.

6. The method of claim 5, further comprising, while copying the contents of the first file to the second file:
    receiving, by the data storage system, an IO request specifying data to be written to the VMD;
    directing, via the copy session, the data specified in the IO request to both to the first file via the first volume interface and to the second file via the second volume interface, for writing the data specified in the IO request to both the first file and the second file.

7. The method of claim 5, wherein the copy operation further includes:
    reading, via the first volume interface, a set of data of the first file into a cache; and
    flushing, via the second volume interface and without providing any additional buffering, the set of data from the cache to the second file.

8. The method of claim 7,
    wherein the first storage pool is operated by a first SP (Storage Processor) of the data storage system,
    wherein the second storage pool is operated by a second SP of the data storage system, wherein the act of reading the set of data into the cache is performed by the first SP, and wherein the act of flushing the set of data from the cache is performed by the second SP.

9. The method of claim 5, wherein migrating the VMD further includes, after completing the copy operation, performing a commit operation, the commit operation including diverting all IO requests arriving at the first volume interface to the second file, such that no subsequent IO requests arriving at the first volume interface are directed to the first file.

10. The method of claim 9, wherein migrating the VMD further includes performing a cleanup operation, the cleanup operation including:

deleting the first file;

destroying the second volume interface; and destroying the second copy driver.

11. The method of claim 1, wherein the VMD is a first VMD, wherein the data storage system operates a second VMD, and wherein the method further comprises instantiating a respective VMD object from the common VMD object model for each of the first VMD and the second VMD.

12. The method of claim 1, wherein the properties of the VMD object include a first file identifier and a second file identifier, and wherein the operations supported by the VMD object include an operation for migrating the VMD from a file identified by the first file identifier to a file identified by the second file identifier.

13. A data storage system, comprising a control circuitry that includes a set of processing units coupled to memory, the control circuitry constructed and arranged to:

store a VMD (virtual machine disk) on a first set of storage extents, the VMD providing storage for a virtual machine running on a VM server coupled to the data storage system, the first set of storage extents formed from a first tier of storage devices of the data storage system and providing a first service level;

receive, by the data storage system from a virtual machine administrative program (VMAP), a request to operate the VMD at a second service level; and in response to receipt of the request, migrate the VMD within the data storage system from the first set of storage extents to a second set of storage extents, the second set of storage extents formed from a second tier of storage devices and providing the second service level, the second set of storage extents being distinct from the first set of storage extents, the first tier including storage drives of a first type, the second tier including storage drives of a second type different from the first type, wherein, after receiving the request and prior to migrating the VMD, the control circuitry is further constructed and arranged to perform a testing operation configured to (i) produce a first result in response to determining that providing the second service level requires migrating the VMD and (ii) produce a second result in response to determining that providing the second service level does not require migrating the VMD, wherein the control circuitry is further constructed and arranged to (i) migrate the VMD in response to the testing operation producing the first result, and, (ii) after migrating the VMD, update the VMAP with new storage information about the VMD, and wherein the control circuitry constructed and arranged to migrate the VMD is further constructed and arranged to perform prepare, bind, copy, commit, and cleanup migration operations on the VMD under direction of a single VMD object instantiated from a common VMD object model, the VMD object being a software construct having multiple properties and supporting multiple operations for the VMD.

14. The data storage system of claim 13, wherein, when constructed and arranged to migrate the VMD, the control circuitry is further constructed and arranged to:

read, by a first SP (Storage Processor) of the data storage system, a set of data of the VMD into a cache from the first set of storage extents; and flush, by a second SP of the data storage system and without providing any additional buffering, the set of data from the cache to the second set of storage extents.

15. A computer program product including a set of non-transitory, computer-readable media having instructions which, when executed by control circuitry of a data storage system, cause the control circuitry to perform a method for managing data storage for virtual machines (VMs), the method comprising:

storing a VMD (virtual machine disk) on a first set of storage extents, the VMD providing storage for a virtual machine running on a VM server coupled to the data storage system, the first set of storage extents formed from a first tier of storage devices of the data storage system and providing a first service level;

receiving, by the data storage system from a virtual machine administrative program (VMAP), a request to operate the VMD at a second service level; and in response to receiving the request, migrating the VMD within the data storage system from the first set of storage extents to a second set of storage extents, the second set of storage extents formed from a second tier of storage devices and providing the second service level, the second set of storage extents being distinct from the first set of storage extents, the first tier including storage drives of a first type, the second tier including storage drives of a second type different from the first type, wherein the method further comprises, after migrating the VMD, updating the VMAP with new storage information about the VMD, and wherein migrating the VMD includes performing prepare, bind, copy, commit, and cleanup migration operations on the VMD under direction of a single VMD object instantiated from a common VMD object model, the VMD object being a software construct having multiple properties and supporting multiple operations for the VMD.

16. The computer program product of claim 15, wherein the VMD is realized within a first file, wherein the first file is part of a first file system, wherein the first file system is supported by a first storage pool within the data storage system, the first storage pool providing the first service level and including the first set of storage extents, and wherein the first set of storage extents is provisioned from the first storage pool to the first file system to support storage of the VMD in the first file.

17. The computer program product of claim 16, wherein migrating the VMD includes performing the following acts:

a prepare operation, the prepare operation including (i) generating a second file system supported by a second storage pool within the data storage system, the second storage pool providing the second service level and including the second set of storage extents and (ii) creating a second file within the second file system;

a bind operation, the bind operation including (i) creating a first volume interface and a first copy driver, the first volume interface enabling read/write access to the first file by the first copy driver and (ii) creating a second volume interface and a second copy driver, the second volume interface enabling read/write access to the second file by the second copy driver;

a copy operation, the copy operation including (i) establishing a copy session between the first copy driver and the second copy driver to enable copying of contents of the first file to the second file and (ii) copying, via the copy session, the contents of the first file to the second file;

a commit operation, the commit operation including diverting all IO requests arriving at the first volume interface to the second file, such that no subsequent IO requests arriving at the first volume interface are directed to the first file; and a cleanup operation, the cleanup operation including (i) deleting the first file, (ii) destroying the second volume interface, and (iii) destroying the second copy driver.

18. The method of claim 1, wherein the VMAP runs on an administrative machine coupled to the data storage system, and wherein the request to operate the VMD at the second service level is initiated by an action taken by an administrator of the VMAP without participation of any administrator of the data storage system.

19. The method of claim 1, wherein updating the VMAP with the new storage information about the VMD is performed in response to the VMAP polling the data storage system to obtain updated storage information about the VMD.

* * * * *